US012568037B2

(12) United States Patent
Zhao et al.

(10) Patent No.: US 12,568,037 B2
(45) Date of Patent: Mar. 3, 2026

(54) INTELLIGENT DYNAMIC NETWORK TRAFFIC MANAGEMENT FOR GLOBAL NETWORK ACCESS TERMINAL

(71) Applicant: Intelligent Fusion Technology, Inc., Germantown, MD (US)

(72) Inventors: Qi Zhao, Germantown, MD (US); Xin Tian, Germantown, MD (US); Yi Li, Germantown, MD (US); Khanh Pham, Kirtland AFB, NM (US); Nichole Sullivan, Germantown, MD (US); Genshe Chen, Germantown, MD (US)

(73) Assignee: Intelligent Fusion Technology, Inc., Germantown, MD (US)

( * ) Notice: Subject to any disclaimer, the term of this patent is extended or adjusted under 35 U.S.C. 154(b) by 1141 days.

(21) Appl. No.: 17/529,751

(22) Filed: Nov. 18, 2021

(65) Prior Publication Data

US 2026/0012410 A1 Jan. 8, 2026

(51) Int. Cl.

*G06N 3/092* (2023.01)
*H04L 41/147* (2022.01)
*H04L 41/16* (2022.01)
*H04L 45/02* (2022.01)

(52) U.S. Cl.

CPC ............ *H04L 45/08* (2013.01); *H04L 41/147* (2013.01); *H04L 41/16* (2013.01)

(58) Field of Classification Search

CPC ........ G06N 20/00; G06N 3/006; G06N 3/045; G06N 3/092; G06N 7/01; H04W 24/08; H04W 76/18

See application file for complete search history.

(56) References Cited

U.S. PATENT DOCUMENTS

2018/0211523 A1* 7/2018 Ashida ................. G08G 1/0141
2020/0238178 A1* 7/2020 Lin ......................... A63F 13/67
2023/0394294 A1* 12/2023 Chiu ..................... G06N 3/092

* cited by examiner

*Primary Examiner* — Mansour Oveissi

(74) *Attorney, Agent, or Firm* — ANOVA LAW GROUP, PLLC

(57) ABSTRACT

The present disclosure provides a deep reinforcement learning (DRL) based dynamic network traffic management system including a LAN router, a plurality of WAN routers, a network switch, and a GNAT controller configured to measure one or more traffic states of a plurality of data flows, obtain an expected reward at the current time point, obtain the one or more traffic states to input to a DRL model to provide an expected reward of each data flow estimated for a next time point, obtain a target reward at the current time point, adjust parameters of the DRL model, predict a plurality of long-term rewards using the trained DRL model, select one of the plurality of long-term rewards, and adjust the bandwidth assigned to each data flow based on the selected long-term reward.

16 Claims, 5 Drawing Sheets

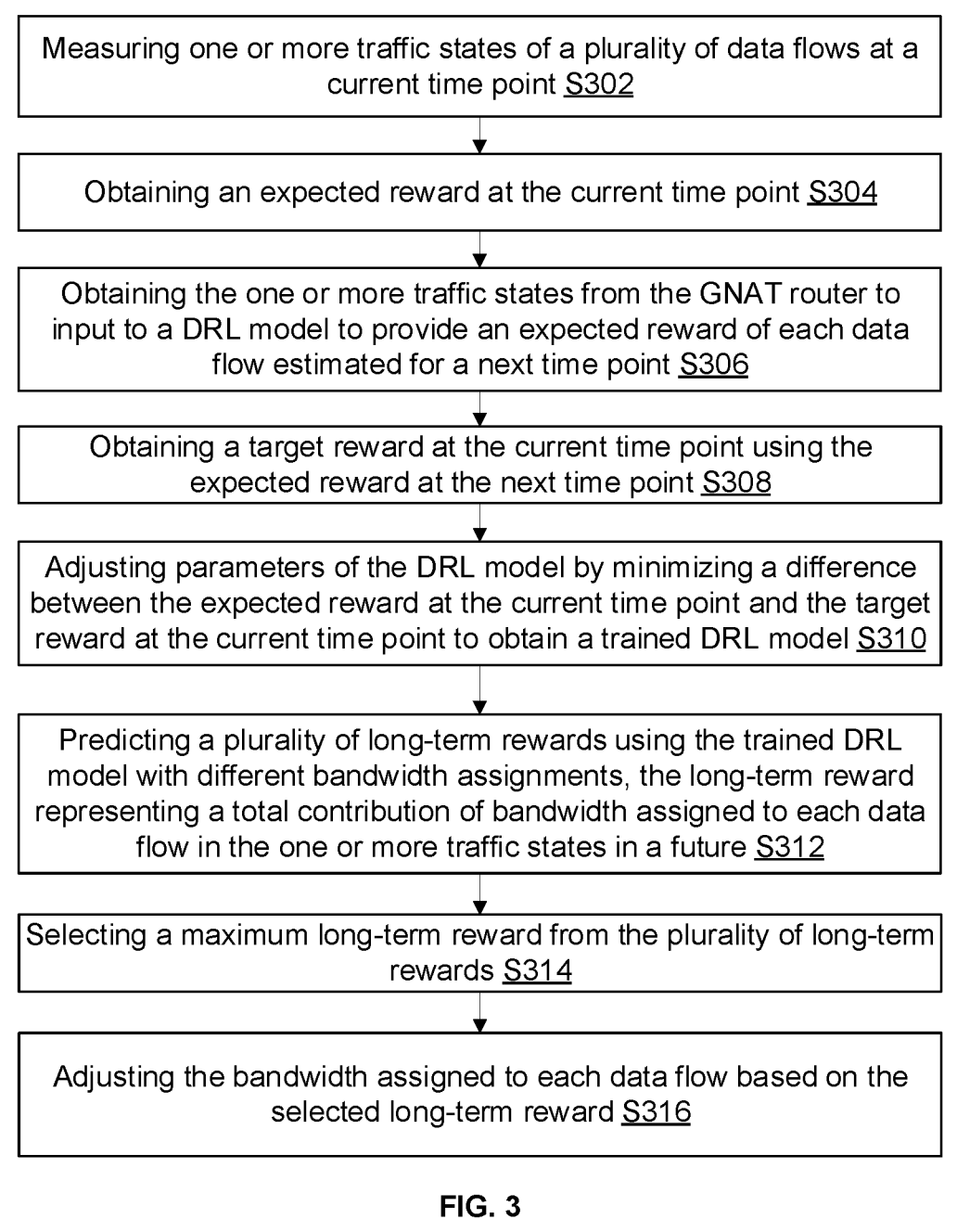

Measuring one or more traffic states of a plurality of data flows at a current time point S302

Obtaining an expected reward at the current time point S304

Obtaining the one or more traffic states from the GNAT router to input to a DRL model to provide an expected reward of each data flow estimated for a next time point S306

Obtaining a target reward at the current time point using the expected reward at the next time point S308

Adjusting parameters of the DRL model by minimizing a difference between the expected reward at the current time point and the target reward at the current time point to obtain a trained DRL model S310

Predicting a plurality of long-term rewards using the trained DRL model with different bandwidth assignments, the long-term reward representing a total contribution of bandwidth assigned to each data flow in the one or more traffic states in a future S312

Selecting a maximum long-term reward from the plurality of long-term rewards S314

Adjusting the bandwidth assigned to each data flow based on the selected long-term reward S316

FIG. 3

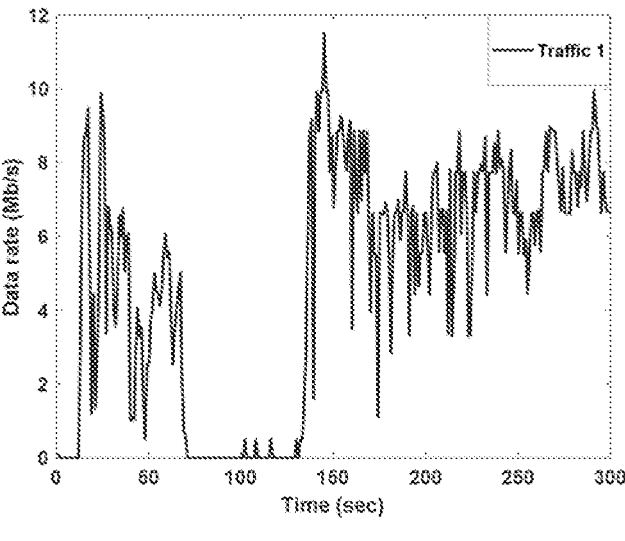
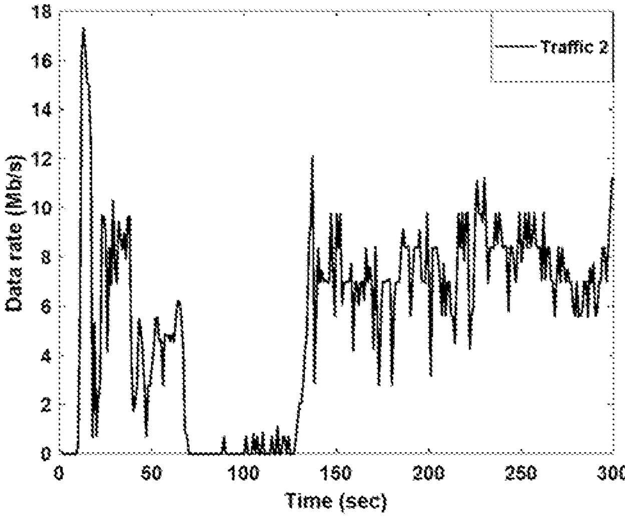
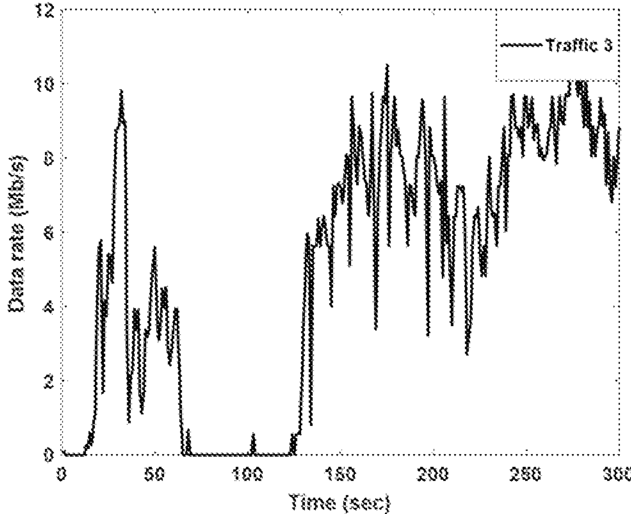
FIG. 4A

INTELLIGENT DYNAMIC NETWORK TRAFFIC MANAGEMENT FOR GLOBAL NETWORK ACCESS TERMINAL

GOVERNMENT RIGHTS

This invention was made with Government support under Contract No. FA8650-19-C-9216, awarded by the United States Air Force Research Laboratory. The U.S. Government has certain rights in this invention.

FIELD OF THE DISCLOSURE

The disclosure generally relates to the field of satellite communication technology, more particularly, relates to a DRL-based dynamic network traffic management system, and a related method for DRL-based dynamic network traffic management.

BACKGROUND

Nowadays, Satellite Communication (SATCOM) plays a vital role in the global telecommunications system. Approximately 2000 artificial satellites orbiting Earth relay analog and digital signals carrying voice, video, and data to and from one or many locations worldwide. It attracts interest from networking researchers and engineers because of the rapid growth, wide coverage and global access. In a relatively short time, SATCOM technology has developed from the experimental to the sophisticated and powerful. Mega-constellations of thousands of satellites designed to bring Internet access to anywhere on Earth are in development. Future communication satellites will have more onboard processing capabilities, more power, and larger-aperture antennas that will enable satellites to handle more bandwidth. With increasing voice, video, and data traffic demanding larger amounts of bandwidth, innovation and development of SATCOM technology are urgently needed for both academia and industry.

Currently, leveraging a mixture of government-owned and commercial SATCOM systems to provide global coverage with improved network throughputs and reliability is an emerging solution for improving the performance of SATCOM communication. However, utilizing multiple SATCOM simultaneously through different satellite networks requires sophisticated traffic management due to the large differences in connection properties. For example, commercial Non-Geo Stationary Orbit (NGSO) SATCOM has advantages of higher network throughputs, much lower propagation delay, and more flexible on-demand services compared to Geosynchronous Equatorial Orbit (GEO) SATCOM systems. Global Network Access Terminal (GNAT) is one of the solutions designed and developed to provide network access utilizing multiple SATCOM for improved throughput, latency, and reliability.

BRIEF SUMMARY OF THE DISCLOSURE

The present disclosure provides an intelligent dynamic network traffic management system, and a related method for dynamic network traffic management. The disclosed intelligent dynamic network traffic management has high communication throughput and low communication latency under certain Quality of Service (Qos) requirements.

The present disclosure provides a deep reinforcement learning (DRL) based dynamic network traffic management (DNTM) system, including a local area network (LAN)

router, a plurality of wireless area network (WAN) routers, a network switch, and a (GNAT) controller configured to measure one or more traffic states of a plurality of data flows at a current time point, input the one or more traffic states to a DRL model to provide an expected reward of each data flow estimated for a next time point, obtain a target reward at the current time point using the expected reward at the next time point, adjust parameters of the DRL model by minimizing a difference between the expected reward at the current time point and the target reward at the current time point to obtain a trained DRL model, predict a plurality of long-term rewards using the trained DRL model with different bandwidth assignments, a long-term reward representing a total contribution of bandwidth assigned to each data flow in the one or more traffic states in a future, select a maximum long-term reward from the plurality of long-term rewards, and adjust the bandwidth assigned to each data flow based on the selected long-term reward.

Optionally, the GNAT controller is further configured to measure the one or more traffic states of the plurality of data flows periodically.

Optionally, the DRL model includes a deep neural network (DNN) to provide an expected reward of each data flow estimated for the next time point.

Optionally, parameters of the DNN are adjusted by minimizing the difference between the expected reward at the current time point and the target reward at the current time point.

Optionally, the traffic state of each data flow includes traffic delay and data rate information.

Optionally, the expected reward of each data flow is defined as:

$$R_t^j = -\frac{\xi\left(\max_{1\le i\le N}\{S_t[i,\ j,\ 1]\} - D[j]\right)^+}{D[j]} + \frac{(1-\xi)\left(\sum_{i=1}^{N} S_t[i,\ j,\ 2] - C[j]\right)^-}{C[j]}$$

where $R_t^j$ represents the expected reward evaluated based on the traffic state $S_t$, $S_t[i, j, 1]$ represents an average traffic delay of data flow j on soft flow i from time point t−1 to t, $S_t[i, j, 2]$ represents an average data rate of data flow j on soft flow i from time point t−1 to t, D[j] represents a packet delay required by data flow j, C[j] represents a data rate required by data flow j, $\xi \in (0,1)$ indicates a relative importance between the packet delay required by data flow j and the data rate required data flow j.

Optionally, the GNAT controller is further configured to update the target reward at the current time point by:

$$\hat{Q}(S_t, A_t) \leftarrow R_{t+1} + \gamma \hat{Q}(S_{t+1}, A_{t+1})$$

where $\hat{Q}(S_t, A_t)$ represents the target reward at time point t, $\hat{Q}(S_{t+1}, A_{t+1})$ represents the target reward at time point t+1, $R_{t+1}$ represent the expected reward at time point t+1, $\gamma$ is a coefficient.

Optionally, the GNAT controller adjusts the bandwidth assigned to each data flow by controlling a transmission rate.

Another aspect of the present disclosure provides a deep reinforcement learning (DRL) based dynamic network traffic management (DNTM) method for communication between a local area network (LAN) router and a plurality of wireless area router (WAN) routers, including: measuring one or more traffic states of a plurality of data flows at a current time, obtaining an expected reward at the current time point, obtaining the one or more traffic states from the GNAT router to input to a DRL model to provide an expected reward of each data flow estimated for a next time point, obtaining a target reward at the current time point using the expected reward at the next time point, adjusting parameters of the DRL model by minimizing a difference between the expected reward at the current time point and the target reward at the current time point to obtain a trained DRL model, predicting a plurality of long-term rewards using the trained DRL model with different bandwidth assignments, the long-term reward representing a total contribution of bandwidth assigned to each data flow in the one or more traffic states in a future, selecting a maximum long-term reward from the plurality of long-term rewards, and adjusting the bandwidth assigned to each data flow based on the selected long-term reward.

Optionally, measuring the one or more traffic states of the plurality of data flows includes measuring the one or more traffic states of the plurality of data flows periodically.

Optionally, the DRL model includes a deep neural network (DNN) to provide an expected reward of each data flow estimated for the next time point.

Optionally, the DRL-based DNTM method further includes adjusting parameters of the DNN by minimizing the difference between the expected reward at the current time point and the target reward at the current time point.

Optionally, the traffic state of each data flow includes traffic delay and data rate information.

Optionally, the expected reward of each data flow is defined as:

$$R_t^j = -\frac{\xi\left(\max_{1\le i\le N}\{S_t[i,j,1]\} - D[j]\right)^+}{D[j]} + \frac{(1-\xi)\left(\sum_{i=1}^{N} S_t[i,j,2] - C[j]\right)^-}{C[j]}$$

where $R_t^j$ represents the expected reward evaluated based on the traffic state $S_t$, $S_t[i, j, 1]$ represents an average traffic delay of data flow j on soft flow i from time point t−1 to t, $S_t[i, j, 2]$ represents an average data rate of data flow j on soft flow i from time point t−1 to t, D[j] represents a packet delay required by data flow j, C[j] represents a data rate required by data flow j, $\xi\in(0,1)$ indicates a relative importance between the packet delay required by data flow j and the data rate required data flow j.

Optionally, the GNAT controller is further configured to update the target reward at the current time point by:

$$\hat{Q}(S_t,A_t)\leftarrow R_{t+1}+\gamma\hat{Q}(S_{t+1},A_{t+1})$$

where $\hat{Q}(S_t, A_t)$ represents the target reward at time point t, $\hat{Q}(S_{t+1}, A_{t+1})$ represents the target reward at time point t+1, $R_{t+1}$ represent the expected reward at time point t+1, $\gamma$ is a coefficient.

Optionally, adjusting the bandwidth assigned to each data flow includes adjusting the bandwidth assigned to each data flow by controlling a transmission rate.

BRIEF DESCRIPTION OF THE DRAWINGS

The following drawings are merely examples for illustrative purposes according to various disclosed embodiments and are not intended to limit the scope of the present disclosure.

FIG. 3 illustrates a flow chart of the intelligent dynamic network traffic management method consistent with the disclosed embodiments of the present disclosure;

FIG. 4A illustrates performance for network traffic management using a conventional best effort method.

DETAILED DESCRIPTION

Reference will now be made in detail to exemplary embodiments of the disclosure, which are illustrated in the accompanying drawings. Wherever possible, the same reference numbers will be used throughout the drawings to refer to the same or similar parts.

The present disclosure provides a deep reinforcement learning (DRL) based dynamic network traffic management (DNTM) system. The key components of the DRL-based DNTM system include a local area network (LAN) router, a network switch, a GNAT controller, and a plurality of wireless area network (WAN) routers. The network switch is configured between the LAN network and the plurality of WAN routers. The GNAT controller is configured to generate one or more policies and make decisions for bandwidth assignment. User devices are connected with the LAN router. WAN providers are connected with the plurality of WAN routers. The system is similar to a network router, which connects the user devices to the WAN to access the network. The only difference is the GNAT system supports a plurality of WANs to provide network access simultaneously.

Another aspect of the present disclosure provides a method for DRL-based DNTM. The DRL based DNTM method includes measuring one or more traffic states, inputting the one or more traffic states to train DRL model to estimate an expected reward, obtaining a target reward using the trained DRL model, and the GNAT controller adjusting bandwidth assigned to each data flow based on the one or more traffic states and the target reward.

One aspect of the present disclosure provides a deep reinforcement learning (DRL) based dynamic network traffic management (DNTM) system.

Figure 1:
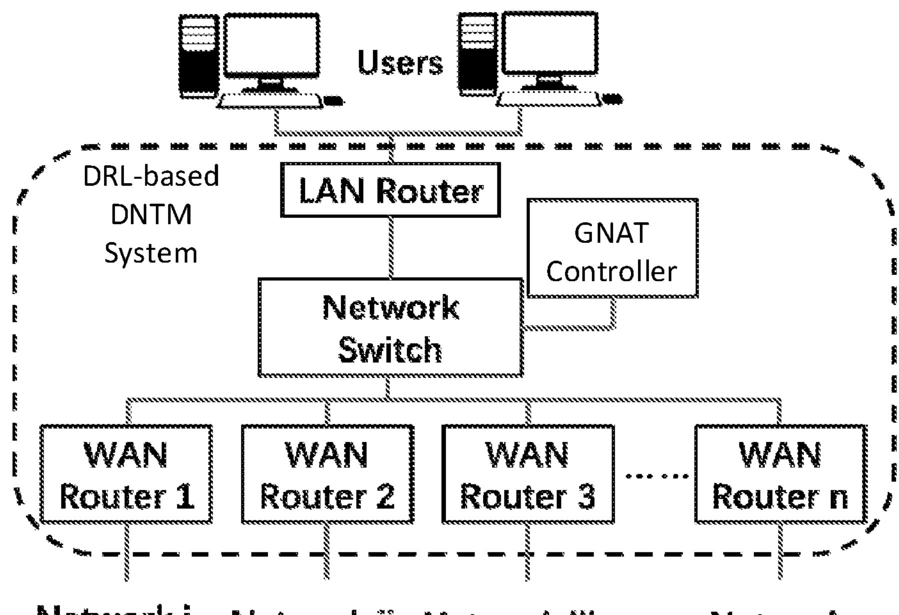
FIG. 1 illustrates an exemplary intelligent dynamic network traffic management (DNTM) system consistent with the disclosed embodiments of the present disclosure.

FIG. 1 illustrates an exemplary intelligent dynamic network traffic management (DNTM) system consistent with the disclosed embodiments of the present disclosure.

The DRL-based DNTM system include a local area network (LAN) router, a global network access terminal (GNAT) controller, a network switch, and a plurality of wireless area network (WAN) routers.

The GNAT controller has the entire view of all the network traffic flows coming from the user devices, and the full control capability over the plurality of WAN routers. Policies are generated by the GNAT controller and then further improved by the DRL-based DNTM system. In addition, connection management is also deployed in the GNAT controller to handle the establishment and management of network connections through a plurality of WAN networks using industrial standard modem interfaces. Benefits of the DRL-based DNTM system include but are not limited to enhanced robustness and enhanced throughput through the plurality of WAN networks.

Figure 2:
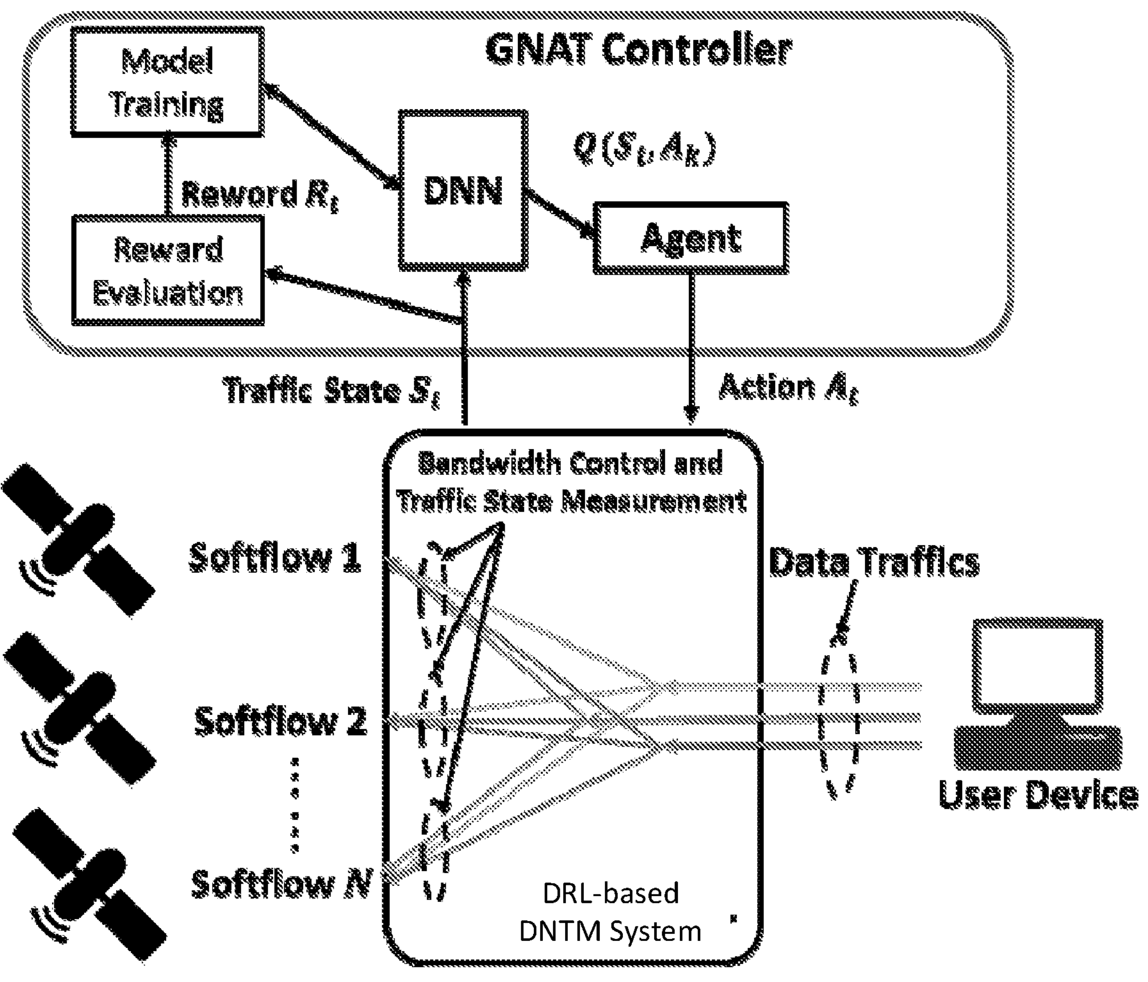
FIG. 2 illustrates deep reinforcement learning based dynamic network traffic management consistent with the disclosed embodiments of the present disclosure.

FIG. 2 illustrates deep reinforcement learning based dynamic network traffic management consistent with the disclosed embodiments of the present disclosure.

Reinforcement learning is a widely used machine learning method for system optimization, in which the optimization problem is formulated as a Markov Decision Process (MDP). In an MDP, an agent makes a sequence of decisions to select a best action according to a current state of the environment and a reward the agent received due to the actions made by the agent in the past.

For the DRL-based DNTM system consistent with the embodiments of the present disclosure, a main goal is to assign available bandwidth resources to each data flow to satisfy Quality of Service (QOS) requirements thereof. The agent is the GNAT controller who makes decisions for bandwidth assignment. The environment is the SATCOM networks used by the DRL-based DNTM system, and the environment state includes a traffic delay and date rate information. The reward indicates how well the QoS requirements of the data flows are satisfied.

In some embodiments, based on the observations of the traffic delay and data rate, and a received reward, the GNAT controller may determine 1) a maximum bandwidth that can be used for the transmission on each soft flow (i.e., network flow at each WAN router in the DRL-based DNTM system), and 2) how much bandwidth should be assigned to each traffic flow on each soft flow. To select an optimal action, the GNAT may estimate an expected reward to be received by taking each action and select the one that gives a maximum expected reward. In the DRL model, a Deep Neural Network (DNN) is used to estimate the expected reward to be receive after taking each action, due to the high dimensionality of the state and action.

In an example embodiment, the DRL-based DNTM system uses N SATCOM services (i.e., N soft flows), which have independent network traffic conditions. There are M data traffics transmitted from one side (e.g., the user device) of the DRL-based DNTM system to another side (e.g., the plurality of WAN routers) of the DRL-based DNTM system. The DNTM of each data traffic is handled by the GNAT controller on transmitter side of each data traffic. Two GNAT controllers work in a same way on both sides. The DRL-based DNTM system forwards data packets to each soft flow. The DRL-based DNTM system controls a data sending rate of each data flow on each soft flow. The DRL-based DNTM system determines how much bandwidth is assigned to each data flow on each soft flow by controlling the sending rate of the DRL-based DNTM system.

The GNAT controller monitors a receiving data rate and the traffic delay of each data flow through each soft flow, and feedbacks an average delay and receiving data rate to the another side of the DRL-based DNTM system periodically.

After the traffic condition from the another side of the DRL-based DNTM system is received, the GNAT controller organizes the traffic information into a traffic state vector for DNTM decision making. The traffic state obtained at time t is denoted as a N×M×2 tensor $S_t$. The element $S_t[i, j, 1]$ represents the average traffic delay of data flow j on soft flow i from time t−1 to t. The element $S_t[i, j, 2]$ represents the average data rate of data flow j on soft flow i from time t−1 to t.

A reward $R_t$ is evaluated based on the traffic state $S_t$. Intuitively, a higher reward indicates that the QoS requirements of more data flows are satisfied. In some embodiments, the QoS requirements include two types, namely a delay requirement D, and a data rate requirement C. An element of the delay requirement vector D[j] represents a packet delay required by data flow i, and an element of the data rate vector C[j] represents a data rate required by data flow j. A reward from data flow j is defined using formula (1) below.

$$R_t^j = -\frac{\xi\left(\max_{1\le i\le N}\{S_t[i, j, 1]\} - D[j]\right)^+}{D[j]} + \frac{(1-\xi)\left(\frac{1}{N}\sum_{i=1}^{N} S_t[i, j, 2] - C[j]\right)^-}{C[j]}, \tag{1}$$

Factor $\xi \in (0,1)$ indicates relative importance between the delay and data rate requirements. A larger $\xi$ value gives a higher weight to delay performance. Function $(x)^+=x$ if $x>0$, otherwise $(x)^+=0$. Similarly, function $(x)^-=x$ if $x<0$, otherwise $(x)^-=0$. The reward does not increase after both delay and data rate requirements are satisfied, even with an improved traffic condition. Therefore, waste of network resources can be avoided on those data flows that do not need more network resources. An overall reward received at time t can be defined using formula (2) below.

$$R_t = \sum_{j=1}^{M} R_t^j. \tag{2}$$

The reward information is sent to the GNAT controller to train the DNN. The DNN is used to provide an estimation of an expected long-term reward $Q(S_t, A_k)$, which represents a total contribution of taking action $A_k$ in a current state s, in the future. The GNAT controller randomly selects an action $A_t$ with a small probability α, and selects an optimal action $A_t$ according to the following formula with a probability of 1−α.

$$A_t = \arg\max_k\{Q(S_t, A_k)\}, \tag{3}$$

In an example embodiment, the GNAT controller sends a final decision to the network switch for bandwidth control. The final decision is a N×M matrix where the element $A_t[i, j]$ represents the bandwidth assigned to data flow j on soft flow i. After the action is taken, the traffic state is changed to $S_{t+1}$ in a next period, and a similar operation is performed to obtain an action $A_{t+1}$.

The GNAT controller keeps adjusting parameters of the DNN to guarantee an accurate estimation on $Q(S_t, A_k)$. The parameters of the DNN are optimized to minimize a difference between the estimated expected reward and a target reward $\hat{Q}(S_t, A_k)$. The difference is defined as a loss function, which can be expressed as follows:

$$L = \frac{1}{T}\sum_t\left(\hat{Q}(S_t, A_t) - Q(S_t, A_t)\right)^2, \tag{4}$$

where T is a total number of samples in each training, or an equivalent total number of decisions made in each training. The GNAT controller minimizes the loss function to adjust the parameters of the DNN for better estimations on the expected reward. To obtain the target reward, the GNAT controller keeps updating the target reward $\hat{Q}(S_t, A_k)$ using formula (5) below, where a range of γ is 0 to 1.

$$\hat{Q}(S_t, A_t) \leftarrow R_{t+1} + \gamma\hat{Q}(S_{t+1}, A_{t+1}) \tag{5}$$

After the DNN is trained, the GNAT controller can adjust the bandwidth assigned to each data flow on each soft flow to better satisfy the QoS requirements thereof. Therefore, the DRL-based DNTM system can provide QoS guarantees in a complicated scenario with a big number of data traffics.

Another aspect of the present disclosure provides a method for deep reinforcement learning (DRL) based dynamic network traffic management (DNTM).

FIG. 3 illustrates a flow chart of the intelligent dynamic network traffic management method consistent with the disclosed embodiments of the present disclosure.

At S302, one or more traffic states are measured of a plurality of data flows of a plurality of network services.

In some embodiments, the traffic state includes traffic delay and data rate information of each data flow.

In some embodiments, the one or more traffic states are measured periodically.

At S304, an expected reward is obtained at the current time point.

At S306, the one or more traffic states is obtained from the GNAT controller to input to a DRL model to provide an expected reward of each data flow estimated for a next time point.

At S308, a target reward at the current time point is obtained using the expected reward at the next time point.

At S310, parameters of the DRL model are adjusted by minimizing a difference between the expected reward at the current time point and the target reward at the current time point to obtain a trained DRL model.

In some embodiments, the DRL model includes a DNN to estimate the expected reward.

In some embodiments, parameters of the DNN are updated by training with the one or more traffic states.

In some embodiments, a higher reward indicates that the QoS requirements of more data flows are satisfied.

In some embodiments, the parameters of the DNN are optimized to minimize a difference between the expected reward and the target reward.

At S312, a plurality of long-term rewards are predicted using the trained DRL model with different bandwidth assignments, the long-term reward representing a total contribution of bandwidth assigned to each data flow in the one or more traffic states in a future.

At S314, a maximum long-term reward is selected from the plurality of long-term rewards.

At S316, the bandwidth assigned to each data flow is adjusted based on the selected long-term reward.

In some embodiments, the bandwidth assigned to each data flow is adjusted by controlling a transmission rate.

A comparison of performance between the DRL-based DNTM method and a conventional best effort flow control method is conducted. In the conventional best effort flow control method, all available bandwidth is used, and all data flows compete for the resources without bandwidth control. In this comparison, three traffic flows keep sending packets through our GNAT system, and the system performance is evaluated using the data rates of these traffics. A data rate requirement for each traffic flow is set as 6 Mb/s. Delay requirements are set to a sufficiently large number so that the delay performance are not to be considered. The GNAT system utilizes three different network services, and the overall bandwidth is about 24 Mb/s.

Figure 4B:
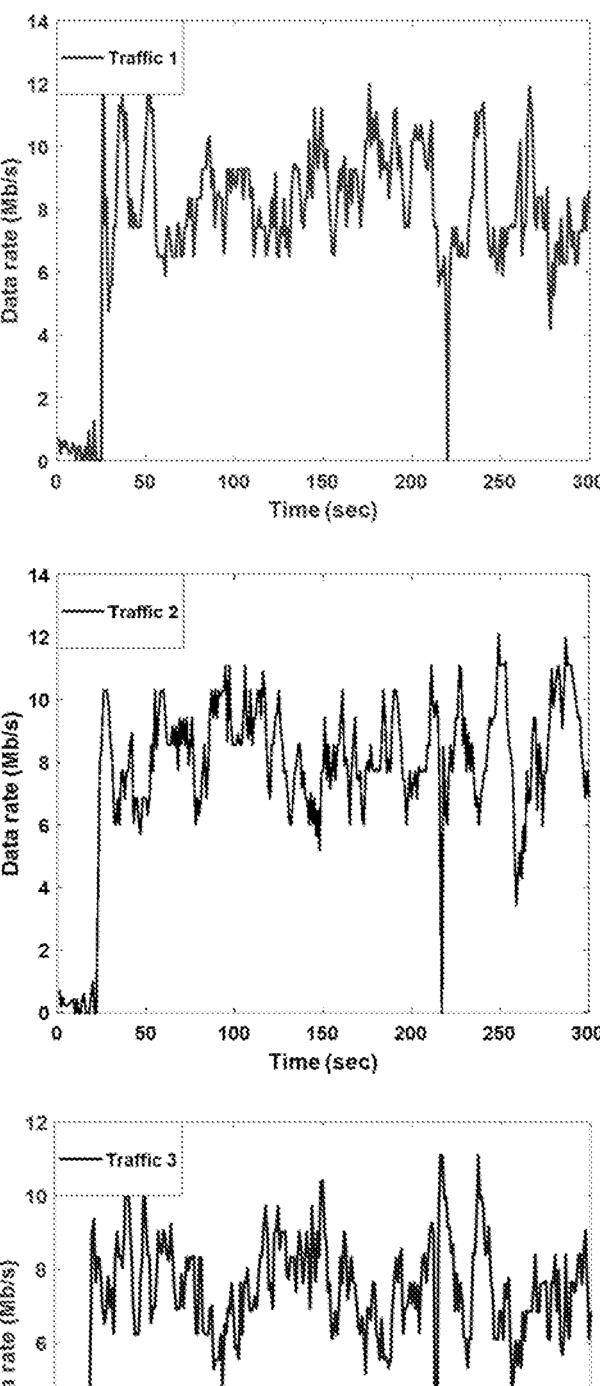
FIG. 4B illustrates performance for network traffic management using a DRL-based DNTM method.

FIG. 4A illustrates performance for network traffic management using a conventional best effort method, and FIG. 4B illustrates performance for network traffic management using a DRL-based DNTM method. As shown in FIGS. 4A and 4B, the DRL-based DNTM method satisfies the QoS requirements of all three traffics in a short time. Due to the variation of the network status, the QoS requirements may not be satisfied at some time. In the DRL-based DNTM method, this situation is noticed from the traffic state soon and the performance are recovered in a very short time. On the other hand, in the conventional method, the data rate of each traffic are not controlled actively. As the result, there is no guarantee that the QoS requirements are satisfied. Due to the competition among the traffics, the network condition becomes bad around time 70 sec. The transport protocol of these traffics reacts to this situation, and the data rates of all traffic drop dramatically.

Those of ordinary skill in the art will appreciate that the example elements and algorithm steps described above can be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure.

A method consistent with the disclosure can be implemented in the form of computer program stored in a non-transitory computer-readable storage medium, which can be sold or used as a standalone product. The computer program can include instructions that enable a computer device, such as a processor, a personal computer, a server, or a network device, to perform part or all of a method consistent with the disclosure, such as one of the example methods described above. The storage medium can be any medium that can store program codes, for example, a USB disk, a mobile hard disk, a read-only memory (ROM), a random access memory (RAM), a magnetic disk, or an optical disk.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A deep reinforcement learning (DRL) based dynamic network traffic management (DNTM) system comprising:

a local area network (LAN) router;

a plurality of wireless area network (WAN) routers;

a network switch; and a global network access terminal (GNAT) controller, configured to:

measure one or more traffic states of a plurality of data flows at a current time point;

obtain an expected reward at the current time point;

input the one or more traffic states to a DRL model to provide an expected reward of each data flow estimated for a next time point; obtain a target reward at the current time point using the expected reward at the next time point;

adjust parameters of the DRL model by minimizing a difference between the expected reward at the current time point and the target reward at the current time point to obtain a trained DRL model;

predict a plurality of long-term rewards using the trained DRL model with different bandwidth assignments, a long-term reward representing a total contribution of bandwidth assigned to each data flow in the one or more traffic states in a future;

select a maximum long-term reward from the plurality of long-term rewards; and adjust the bandwidth assigned to each data flow based on the selected long-term reward.

2. The system according to claim 1, wherein the GNAT controller is further configured to measure the one or more traffic states of the plurality of data flows periodically.

3. The system according to claim 1, wherein the DRL model includes a deep neural network (DNN) to provide an expected reward of each data flow estimated for the next time point.

4. The system according to claim 3, wherein parameters of the DNN are adjusted by minimizing the difference between the expected reward at the current time point and the target reward at the current time point.

5. The system according to claim 1, wherein the traffic state of each data flow includes traffic delay and data rate information.

6. The system according to claim 5, wherein the expected reward of each data flow is defined as:

$$R_t^j = -\frac{\xi\left(\max_{1\le i\le N}\{S_t[i,j,1]\} - D[j]\right)^+}{D[j]} + \frac{(1-\xi)\left(\sum_{i=1}^{N} S_t[i,j,2] - C[j]\right)^-}{C[j]}$$

where $R_t^j$ represents the expected reward evaluated based on the traffic state $S_t$, $S_t[i, j, 1]$ represents an average traffic delay of data flow j on soft flow i from time point t−1 to t, $S_t[i, j, 2]$ represents an average data rate of data flow j on soft flow i from time point t−1 to t, D[j] represents a packet delay required by data flow j, C[j] represents a data rate required by data flow j, $\xi\in(0,1)$ indicates a relative importance between the packet delay required by data flow j and the data rate required data flow j.

7. The system according to claim 1, wherein the GNAT controller is further configured to update the target reward at the current time point by:

$$\hat{Q}(S_t,A_t)\leftarrow R_{t+1}+\gamma\hat{Q}(S_{t+1},A_{t+1})$$

where $\hat{Q}(S_t, A_t)$ represents the target reward at time point t, $\hat{Q}(S_{t+1}, A_{t+1})$ represents the target reward at time point t+1, $R_{t+1}$ represent the expected reward at time point t+1, $\gamma$ is a coefficient.

8. The system according to claim 1, wherein the GNAT controller is configured to adjust the bandwidth assigned to each data flow by controlling a transmission rate.

9. A deep reinforcement learning (DRL) based dynamic network traffic management (DNTM) method for communication between a local area network (LAN) router and a plurality of wireless area router (WAN) routers, comprising:

measuring one or more traffic states of a plurality of data flows at a current time;

obtaining an expected reward at the current time point;

obtaining the one or more traffic states from a global network access terminal (GNAT) router to input to a DRL model to provide an expected reward of each data flow estimated for a next time point;

obtaining a target reward at the current time point using the expected reward at the next time point;

adjusting parameters of the DRL model by minimizing a difference between the expected reward at the current time point and the target reward at the current time point to obtain a trained DRL model;

predicting a plurality of long-term rewards using the trained DRL model with different bandwidth assignments, the long-term reward representing a total contribution of bandwidth assigned to each data flow in the one or more traffic states in a future;

selecting a maximum long-term reward from the plurality of long-term rewards; and adjusting the bandwidth assigned to each data flow based on the selected long-term reward.

10. The method according to claim 9, wherein measuring the one or more traffic states of the plurality of data flows includes measuring the one or more traffic states of the plurality of data flows periodically.

11. The method according to claim 9, wherein the DRL model includes a deep neural network (DNN) to provide an expected reward of each data flow estimated for the next time point.

12. The method according to claim 11, further comprising:

adjusting parameters of the DNN by minimizing the difference between the expected reward at the current time point and the target reward at the current time point.

13. The method according to claim 9, wherein the traffic state of each data flow includes traffic delay and data rate information.

14. The method according to claim 13, wherein the expected reward of each data flow is defined as:

$$R_t^j = -\frac{\xi\left(\max_{1\le i\le N}\{S_t[i,j,1]\} - D[j]\right)^+}{D[j]} + \frac{(1-\xi)\left(\sum_{i=1}^{N} S_t[i,j,2] - C[j]\right)^-}{C[j]}$$

where $R_t^j$ represents the expected reward evaluated based on the traffic state $S_t$, $S_t[i, j, 1]$ represents an average traffic delay of data flow j on soft flow i from time point t−1 to t, $S_t[i, j, 2]$ represents an average data rate of data flow j on soft flow i from time point t−1 to t, D[j] represents a packet delay required by data flow i, C[j] represents a data rate required by data flow j, $\xi\in(0,1)$ indicates a relative importance between the packet delay required by data flow j and the data rate required data flow j.

15. The method according to claim 9, further comprising: updating the target reward at the current time point by:

$$\hat{Q}(S_t,A_t)\leftarrow R_{t+1}+\gamma\hat{Q}(S_{t+1},A_{t+1})$$

where $\hat{Q}(S_t, A_t)$ represents the target reward at time point t, $\hat{Q}(S_{t+1}, A_{t+1})$ represents the target reward at time point t+1, $R_{t+1}$ represent the expected reward at time point t+1, $\gamma$ is a coefficient.

16. The system according to claim 9, wherein adjusting the bandwidth assigned to each data flow includes:

adjusting the bandwidth assigned to each data flow by controlling a transmission rate.

* * * * *